US012065709B2

(12) United States Patent
Patrizio et al.

(10) Patent No.: US 12,065,709 B2
(45) Date of Patent: Aug. 20, 2024

(54) METHOD OF STIRRING LIQUID METAL IN AN ELECTRIC ARC FURNACE

(71) Applicant: DANIELI & C. OFFICINE MECCANICHE S.P.A., Buttrio (IT)

(72) Inventors: Damiano Patrizio, Pagnacco (IT); Andrea Codutti, Moruzzo (IT); Paolo Burin, Tricesimo (IT); Romano Sellan, Trieste (IT); Nicola Gagliardi, Buttrio (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 286 days.

(21) Appl. No.: 17/761,881

(22) PCT Filed: Sep. 15, 2020

(86) PCT No.: PCT/IT2020/050223
§ 371 (c)(1),
(2) Date: Mar. 18, 2022

(87) PCT Pub. No.: WO2021/053701
PCT Pub. Date: Mar. 25, 2021

(65) Prior Publication Data
US 2022/0333219 A1    Oct. 20, 2022

(30) Foreign Application Priority Data
Sep. 19, 2019   (IT) .................. 102019000016790

(51) Int. Cl.
*C21C 5/52* (2006.01)
*B01F 33/451* (2022.01)
(Continued)

(52) U.S. Cl.
CPC .......... *C21C 5/5247* (2013.01); *B01F 33/451* (2022.01); *F27B 3/10* (2013.01);
(Continued)

(58) Field of Classification Search
CPC .... F27B 3/085; F27B 3/10; F27B 3/18; F27B 3/28; F27D 27/00; F27D 27/005;
(Continued)

(56) References Cited

U.S. PATENT DOCUMENTS

| 3,409,726 A | 11/1968 | Matsumo et al. |
| 8,876,934 B2 | 11/2014 | Eriksson et al. |
| 2019/0390908 A1* | 12/2019 | Teng .................. F27B 3/18 |

FOREIGN PATENT DOCUMENTS

| EP | 2616560 | 11/2013 |
| EP | 2751510 | 7/2014 |

(Continued)

OTHER PUBLICATIONS

International Search Report and Written Opinion, issued in the corresponding PCT application No. PCT/IT2020/050223 dated Nov. 25, 2020, 18 pages.

(Continued)

*Primary Examiner* — Hung D Nguyen
(74) *Attorney, Agent, or Firm* — HSML P. C.

(57) ABSTRACT

A method for electromagnetic stirring of liquid metal in a continuous charge electric arc furnace, in which there are positioned a first electromagnetic field along a first axis of electromagnetic stirring and a second electromagnetic field along a second axis of electromagnetic stirring.

10 Claims, 3 Drawing Sheets

(51) Int. Cl.
| | |
|---|---|
| *F27B 3/10* | (2006.01) |
| *F27D 27/00* | (2010.01) |
| *B01F 101/45* | (2022.01) |
| *F27B 3/08* | (2006.01) |
| *F27D 3/00* | (2006.01) |

(52) U.S. Cl.
CPC .......... *F27D 27/00* (2013.01); *B01F 2101/45* (2022.01); *F27B 3/085* (2013.01); *F27D 2003/0055* (2013.01); *F27D 2003/0083* (2013.01)

(58) Field of Classification Search
CPC ..... F27D 2003/0039; F27D 2003/0043; F27D 2003/0054; F27D 2003/0055; F27D 2003/0083; C21C 5/52; C21C 5/5229; C21C 5/5247; B01F 33/451; B01F 2101/45; Y02P 10/20; Y02P 10/25; Y02P 10/253
See application file for complete search history.

(56) References Cited

FOREIGN PATENT DOCUMENTS

| | | |
|---|---|---|
| EP | 2978548 | 2/2016 |
| GB | 725518 A * | 8/1953 |
| JP | 43-021239 | 9/1943 |
| JP | 49-005691 | 2/1974 |
| JP | 62-73591 | 4/1987 |
| JP | 2013-539851 | 10/2013 |
| WO | 2018/145754 | 8/2018 |

OTHER PUBLICATIONS

Stahl et al., "Electromagnetic stirring in electric arc furnace", Steel 2009 Technology, vol. 29, No. 1, Nov. 12, 2009, 3 pages.
Japanese Office Action, issued in the corresponding Japanese patent application No. 2022-517742, dated Jun. 13, 2023, 10 pages (English translation is enclosed).

* cited by examiner

METHOD OF STIRRING LIQUID METAL IN AN ELECTRIC ARC FURNACE

FIELD OF THE INVENTION

The present invention concerns a method for electromagnetic stirring of liquid metal in an electric arc furnace, usable in the processes of melting metal material with a substantially continuous charge.

BACKGROUND OF THE INVENTION

Plants for melting metal material of the continuous charge type are known, which comprise an electric arc furnace provided with at least one container, or shell, inside which the metal charge is melted.

The electric arc furnace also comprises a covering roof that has apertures for the passage of the electrodes, which enter the shell to allow the electric arc to be triggered, thus allowing the metal charge to melt. The roof also has apertures for the extraction of the fumes, while on the bottom or side of the shell there are normally means for tapping the liquid metal.

The electric arc furnace is associated with means to feed the metal material, which can be continuous charge systems.

The solutions of the continuous charge type normally use, to perform the first starting charge with the furnace switched off, a charging system with a basket, in order to create a mass of metal material on the bottom of the furnace to be melted at the start of the cycle. Normally, when this mass is completely melted, the process of continuously charging the scrap into the furnace is started.

In the most common solutions, the electric arc furnace has a decentered tapping hole on the bottom of the shell, called "Eccentric Bottom Tapping" or EBT, or, alternatively, a tapping spout for the extraction of the molten metal from the shell during the tapping step.

The tapping step follows the refining step, during which specific elements are introduced into the molten metal in order to improve its quality or to give it the desired properties, depending on the recipe of the steel to be obtained.

One of the most common disadvantages in this type of melting processes is that of the homogenization of the temperature of the molten metal inside the shell.

The lack of homogeneity of the temperature of the mass of molten metal can lead to problems such as unwanted concentrations of some elements, incorrect measurements of the process parameters, localized temperature peaks, premature wear of components or other problems known in the field.

To solve these problems, the use of electromagnetic stirrers is known, normally disposed under the bottom of the furnace or at most associated with the lateral walls thereof.

For example, document WO 2018/145754 describes an electric arc furnace which has an electromagnetic stirrer located in a substantially central position under the bottom of the shell and having an electromagnetic stirring axis which intersects a central vertical plane passing through the center of the shell and the tapping hole, or the tapping spout.

Document EP 2616560 B1 is also known, which describes an electric arc furnace provided with two electromagnetic stirrers opposite each other with respect to the central axis of the furnace.

U.S. Pat. No. 3,409,726 is also known, which generically indicates that the direction of movement of the molten metal can be easily inverted by inverting the polarity of the direct current passing through the molten metal or of the excitation current of the electromagnet. U.S. '726 describes the use of a magnetic pole in axis with the center of the bottom of the shell, or, in addition to this central magnetic pole, of three magnetic poles disposed radially and equidistant on the circumference of the electric furnace.

JP 62-73591 describes a magnetic stirring device for electric arc furnaces. This device comprises an electromagnetic stirrer which can be moved under the furnace to assume variable positions in relation to the different steps of the melting cycle.

The solutions that use stirrers to stir the molten metal inside the furnace do not usually provide a correlation between the action of the stirrers themselves and the steps of the melting cycle.

This can entail excessive wear of the internal walls of the shell, where the liquid metal has a higher speed, and the definition of dead zones where the liquid metal tends to stagnate, not amalgamating optimally with the surrounding liquid metal.

There is therefore a need to perfect a method for electromagnetic stirring of liquid metal in an electric arc furnace which can overcome the disadvantages of the state of the art.

In particular, one purpose of the present invention is to perfect a method for electromagnetic stirring of liquid metal in an electric arc furnace that prevents problems of differentiated wear on the walls and bottom of the furnace, makes the temperature homogeneous throughout the mass of liquid metal and increases the efficiency of the melting and refining steps inside the furnace.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purpose, the present invention concerns a method for electromagnetic stirring of liquid metal in association with a melting cycle in an electric arc furnace which provides at least one charging step, during which a metal charge is introduced into the furnace, a melting step and a step of refining the liquid metal in the electric arc furnace.

In accordance with one aspect of the present invention, such electromagnetic stirring is applied in a continuous charge electric arc furnace in which, by means of at least two electromagnetic stirrers disposed under the hearth or bottom of the furnace, at least one first electromagnetic field along a first axis of electromagnetic stirring and at least one second electromagnetic field along a second axis of electromagnetic stirring are generated.

According to one aspect of the invention, in at least a first step of the cycle of the furnace the first electromagnetic field and the second electromagnetic field generate mixing forces on the liquid metal having a discordant sense with respect to each other, and in at least a second step of the cycle of the furnace the electromagnetic fields generate forces on the liquid metal having a concordant sense with respect to each other.

The term "discordant", here and hereafter in the description, indicates that the axis of the mixing forces generated by a first electromagnetic stirrer has an opposite sense with respect to the axis of the mixing forces generated by the second electromagnetic stirrer; the term "concordant" on the other hand indicates that the axes of the mixing forces generated by both electromagnetic stirrers have the same sense, that is, they have the same direction.

In this way, when the senses of the axes of the forces are discordant, or opposite, there is a stirring of the steel prevalent toward the entire periphery of the shell, with a substantially circular and tangential movement of the steel with respect to the refractory wall of the shell.

When, on the other hand, the axes of the electromagnetic forces have a concordant sense, both the stirrers promote a movement of the steel toward a same peripheral zone of the furnace, and the steel is bounced on the perimeter and returns toward the center.

Differentiating the mixing action in relation to the steps of the melting process allows, in addition to obtaining a liquid metal that has very uniform thermophysical characteristics and characteristics of chemical composition, also to optimize the overall energy consumption of the electric arc furnace and to reduce overall cycle times.

ILLUSTRATION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

Figure 1:
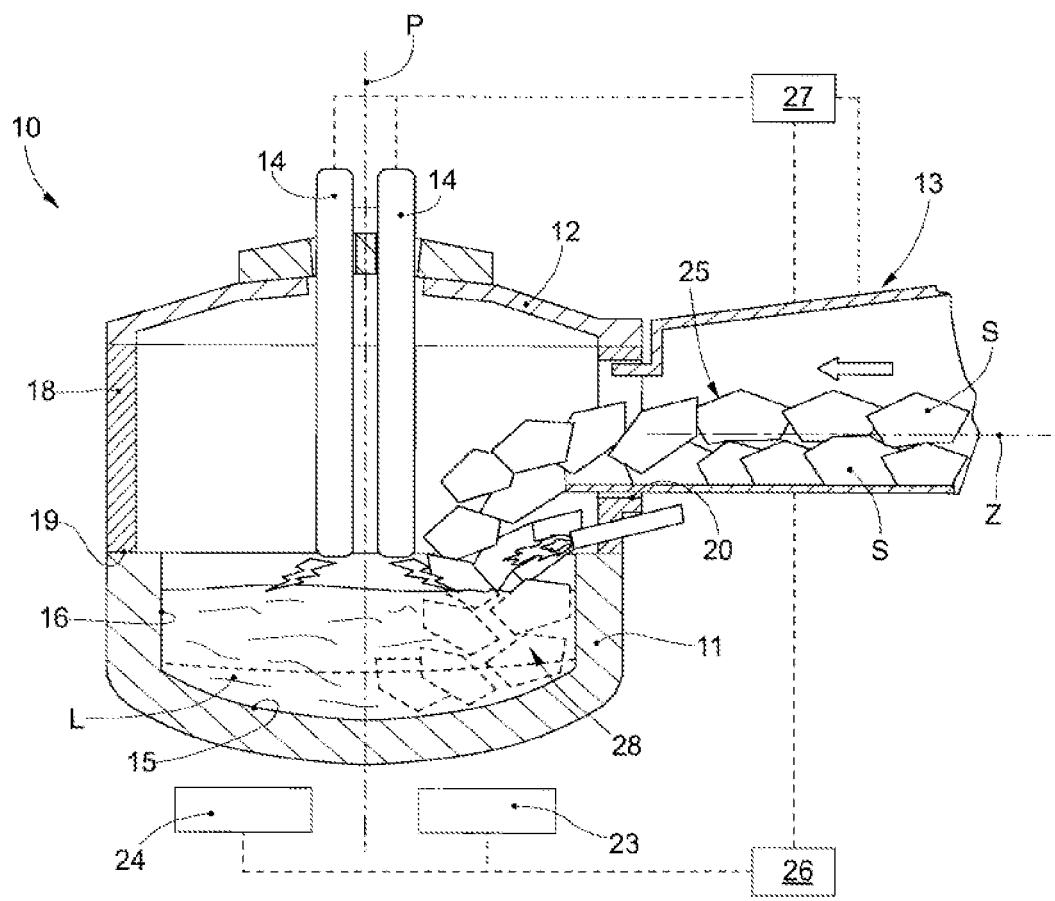
FIG. 1 is a schematic sectional representation of an electric arc furnace in which the electromagnetic stirring method of the present invention is applicable.

We will now refer in detail to possible embodiments of the invention, of which one or more examples are shown in the attached drawings. Each example is supplied by way of illustration of the invention and shall not be understood as a limitation thereof. For example, the characteristics shown or described insomuch as they are part of one embodiment can be varied or adopted on, or in association with, other embodiments to produce other embodiments. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments described in the attached drawings concern an electric arc furnace, identified as a whole with reference number 10, inside which the liquid metal L is mixed in accordance with the electromagnetic stirring method of the present invention.

The electric arc furnace 10 can be of the type powered by alternating current AC, characterized by the presence of three or more electrodes 14 between which the electric arc strikes to ignite and/or continue the melting process, or by direct current DC, characterized by the presence of one or two electrode(s) 14 disposed centrally which perform the function of cathode cooperating with anodes located on the bottom of the electric arc furnace 10 in order to generate the electric arc.

Although in the drawings described here we refer to an electric arc furnace 10 of the type powered by alternating current AC, it is evident that the concepts described below are also applicable to an electric arc furnace 10 of the type powered by direct current DC.

In accordance with the embodiment shown in FIG. 1, an electric arc furnace 10 comprises, in its essential parts, a container, or shell 11, and a covering element, or roof 12, disposed above and covering the shell 11.

With the electric arc furnace 10 there are associated means 13 to continuously feed the metal charge 25, which can comprise for example scrap S.

The feed means 13 are suitable to move the metal charge 25 according to a determinate axis of feed Z.

Figure 2:
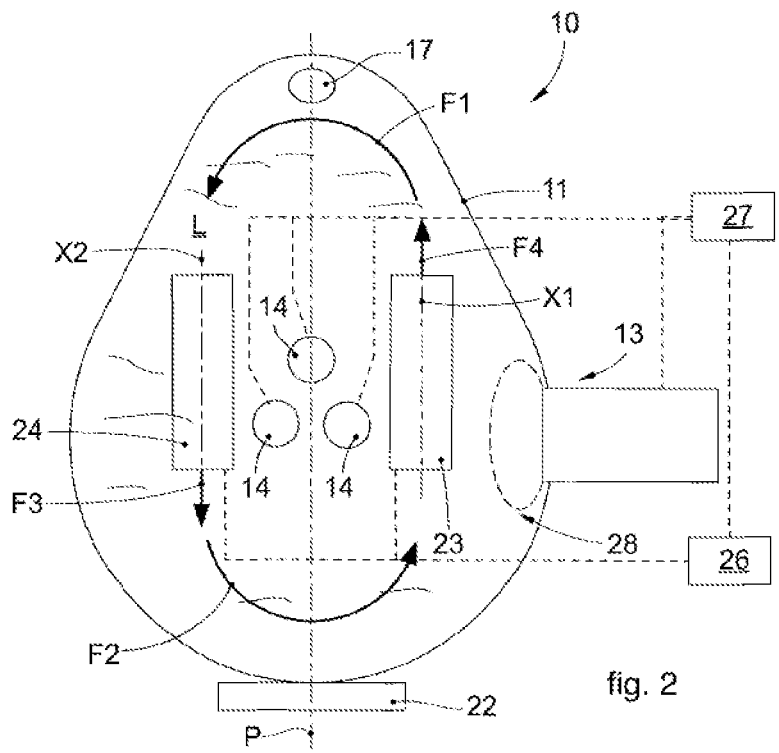
FIG. 2 and FIG. 3 are respective schematic representations of the stirring method according to the present invention.
Figure 3:
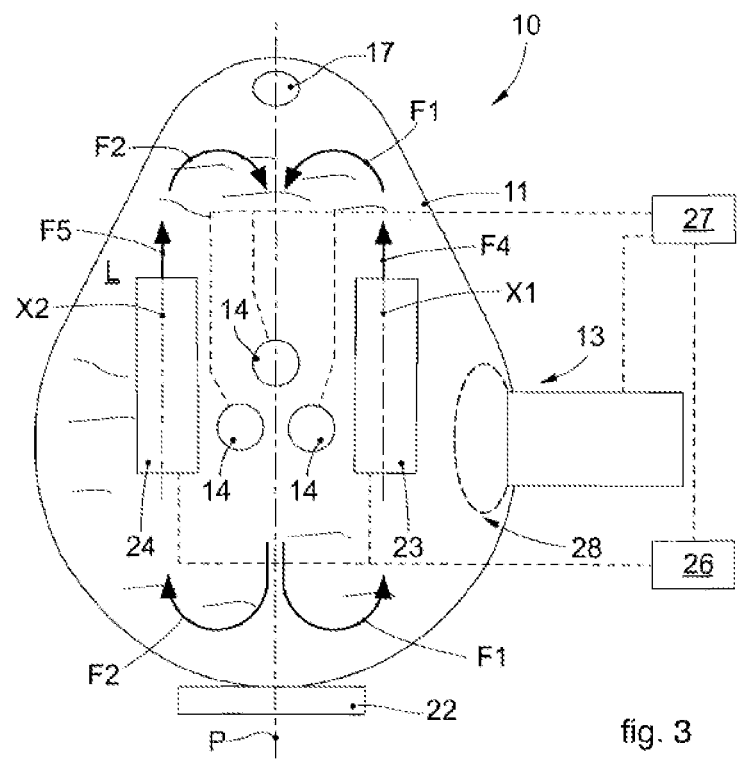

In accordance with some embodiments, the feed means 13 can be disposed laterally, FIGS. 1-3, to introduce the metal charge 25 with respect to a lateral flank of the electric arc furnace 10, or at the upper part, to introduce the metal charge 25 from an aperture made in the roof 12.

The metal charge 25 is positioned in a known manner on the feed means 13, and can have a determinate sizing which can be even highly variable.

The hole(s) for housing and/or positioning the electrodes 14 are made in the roof 12, which are suitable to generate an electric arc to melt the metal charge present in the shell 11.

The roof 12 and the electrodes 14 are associated with lifting and rotation devices, which are suitable to lift the roof 12 and the electrodes 14, even independently of each other.

The shell 11 is provided with a bottom, or hearth 15, and a lateral wall 16 made at least partly in refractory material in order to withstand the high temperatures reached in the melting step, and the highly reactive environment.

The bottom 15 can be provided with a decentered tapping hole 17, also called "Eccentric Bottom Tapping" EBT, or, alternatively or additionally, with a tapping spout for the extraction of the molten metal from the shell 11 during the tapping step.

The shell 11 is mounted on supports not visible in the drawings, and actuation means are conventionally provided to rotate the shell 11 itself around a determinate axis of rotation.

The furnace 10 also comprises a lining 18 provided with a lower edge 19 disposed resting on the upper edge of the shell 11.

The lining 18, generally consisting of cooled panels, develops substantially in progression with the walls of the shell 11, and the roof 12 is disposed above it in order to provide to close the latter.

The lining 18 is provided with a first aperture 20, through which are positioned the feed means 13 to feed the metal charge 25, and with a second aperture, through which the slagging operations can be performed.

Inside the shell 11, below the first aperture 20, there is a charging zone 28 where the newly introduced metal charge 25 accumulates.

The charging zone 28 is located in a peripheral position with respect to the central zone of the electric arc furnace 10, where the electrodes 14 are present.

The second aperture can be selectively made accessible/inaccessible by a slagging door 22, which is generally located in an opposite position with respect to the tapping hole 17, FIGS. 2-3.

In accordance with some embodiments, shown in FIGS. 2 and 3, the electric arc furnace 10 is provided, underneath the shell 11, with two electromagnetic stirrers 23, 24 configured to generate mixing forces F1, F2 in the liquid metal L present inside the shell 11 during the smelting process.

As can be seen in the drawings, the electromagnetic stirrers 23, 24 can be disposed in an opposite and specular manner, in order to form a pair of electromagnetic stirrers with respect to a central plane P.

The electric arc furnace 10 comprises a power supply device 26 configured to power the electromagnetic stirrers 23, 24 and a control unit 27, operatively connected to the power supply device 26 in order to control the drive of the electromagnetic stirrers 23, 24.

In accordance with some embodiments, each electromagnetic stirrer 23, 24 comprises a body made of magnetic material around which coils of electrically conductive material are wound. The coils are configured to be powered with an electric current by the power supply device 26, generating a magnetic field in the direction of an axis of electromagnetic stirring of the electromagnetic stirrer 23, 24.

In accordance with some embodiments, with the control unit 27 there can also be operatively associated the power supply means 13 and the electrodes 14.

A first electromagnetic stirrer 23 is energized so as to generate a first electromagnetic field along a first axis of electromagnetic stirring X1.

A second electromagnetic stirrer 24 is energized so as to generate a second electromagnetic field of forces along a second axis of electromagnetic stirring X2.

According to further embodiments, shown in FIG. 4, there can be a number of electromagnetic stirrers 123, 124 greater than two in order to generate, along an axis of electromagnetic stirring X, a corresponding number of electromagnetic fields.

Figure 4A:
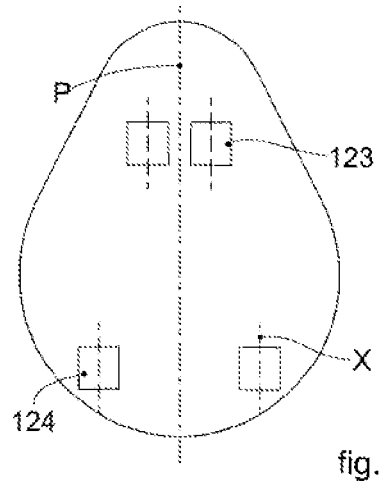
FIGS. 4a-4f are schematic representations of possible alternative dispositions of electromagnetic stirrers in an electric arc furnace in which the electromagnetic stirring method of the present invention is applicable.
Figure 4B:
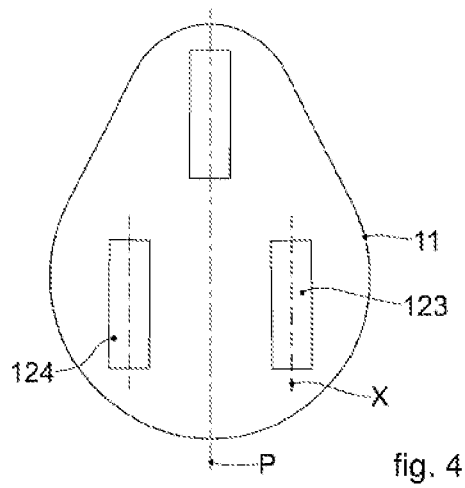
Figure 4C:
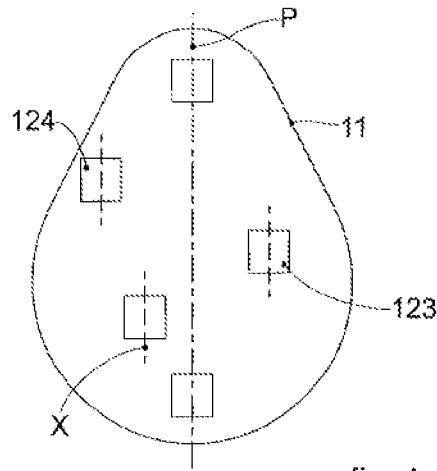
Figure 4D:
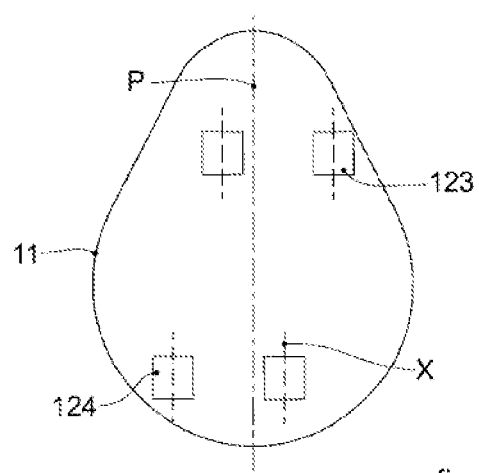
Figure 4E:
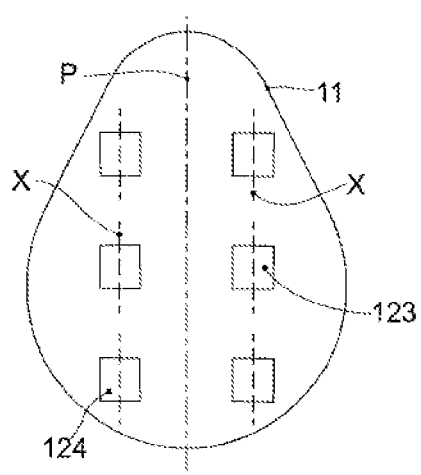

According to some embodiments, the electromagnetic stirrers 123, 124 can be disposed to form pairs of electromagnetic stirrers, for example two pairs (FIG. 4a, 4d) or more, for example, three pairs (FIG. 4e).

Alternative embodiments can provide that pairs of opposite electromagnetic stirrers 123 are disposed offset (FIG. 4d) or aligned (FIG. 4e) with respect to the central plane P.

According to other embodiments, the electromagnetic stirrers 123, 124 of one pair can be positioned so as to have different distances with respect to the central plane P (FIG. 4d).

In other embodiments, different pairs of electromagnetic stirrers 123, 124 can have different distances from the central plane P (FIG. 4a).

Further embodiments can provide an odd number of electromagnetic stirrers 123, 124, for example 3 or 5 (FIG. 4b, 4c).

In the embodiments that provide an odd number of electromagnetic stirrers 123, 124, it is possible to dispose at least two stirrers as an opposite pair (FIG. 4b) with respect to the central plane P.

According to some embodiments, it is possible to dispose one or more electromagnetic stirrers 123, 124 substantially in correspondence with the central plane P (FIG. 4b, 4c).

Some embodiments can provide that the central plane P divides the number of electromagnetic stirrers 123, 124 asymmetrically (FIG. 4c).

Figure 4F:
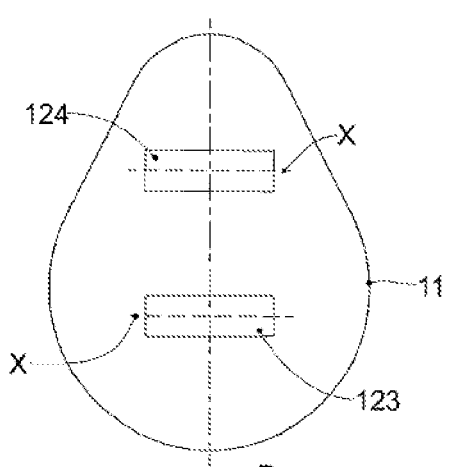

In other embodiments, the electromagnetic stirrers 123, 124 can be disposed so that their axis of stirring X is inclined with respect to the central plane P, for example, orthogonally (FIG. 4f).

According to further embodiments, not shown here, the electric arc furnace 10 can be provided with electromagnetic stirrers 123, 124 with axes of stirring X oriented differently with respect to each other.

In accordance with some embodiments, the electromagnetic stirrers 123, 124 can be suitably sized with respect to the size of the shell 11 and/or to the desired disposition.

Some embodiments, not shown here, can provide an electric arc furnace 10 provided with electromagnetic stirrers 123, 124 of different sizes with respect to each other.

In accordance with some embodiments, the first axis of electromagnetic stirring X1 and the second axis of electromagnetic stirring X2 are parallel to each other and with respect to the central plane P.

The central plane P is vertical and passing through the center of the bottom 15 of the shell 11 and through the tapping hole 17, or alternatively through the tapping spout.

The central plane P can be a plane of symmetry at least for the shell 11.

In accordance with some embodiments, the shell 11 has a top plan section which can have a curved shape, for example defined by the joining of one or more curves suitably chosen in a group comprising a circumference, a parabola, an ellipse, a line.

In accordance with some embodiments, the shell 11 has an elongated curved shape in the direction of the tapping hole 17 which, as a consequence, is positioned very far from the center of the shell 11.

With reference by way of example to FIGS. 2-3, there is described a method for electromagnetic stirring of the liquid metal L in an electric arc furnace 10.

Inside the electric arc furnace 10 a melting process is carried out that comprises at least one charging step, during which a metal charge 25 is introduced and melted, which is added to the liquid metal L already previously melted, which is followed by a step of refining the liquid metal L in the electric arc furnace 10.

In the method for electromagnetic stirring of liquid metal in a continuous charge electric arc furnace 10 according to the invention, a first electromagnetic field along a first axis of electromagnetic stirring X1 and a second electromagnetic field along a second axis of electromagnetic stirring X2 are generated.

According to one aspect of the invention, in a first step said first electromagnetic field and said second electromagnetic field generate mixing forces F1, F2 on the liquid metal L having a discordant sense with respect to each other, and in a second step said electromagnetic fields generate forces F1, F2 on the liquid metal L having a concordant sense with respect to each other.

In an advantageous solution, said first step is the charging step and said second step is the refining step.

In accordance with some embodiments, shown in FIGS. 2-3, both during the at least one charging step and also during the refining step, the first axis of electromagnetic stirring X1 and the second axis of electromagnetic stirring X2 are parallel to each other and with respect to the central vertical plane P, passing through the center of the electric arc furnace 10 and through a tapping hole 17 of the electric arc furnace 10.

In accordance with some embodiments, during the at least one charging step, the mixing forces F1, F2 determine a flow of liquid metal L in a counterclockwise peripheral direction, FIG. 2.

In other words, in the charging step as above the axes of generation of the mixing forces F1, F2, respectively of the first electromagnetic stirrer 23 and of the second electromagnetic stirrer 24, are directed in an opposite, or discordant, direction with respect to each other. In FIG. 2, the opposite senses of the generation of the forces are indicated with F3 for the electromagnetic stirrer 23 and F4 for the electromagnetic stirrer 24.

In this way, there is a stirring of the steel prevailing toward the entire periphery of the shell 11, with a movement of the liquid metal L substantially circular and tangential with respect to the refractory wall of the shell 11.

In other embodiments, the mixing forces F1, F2 determine a flow of liquid metal L in a clockwise peripheral direction (not shown).

The position of the magnetic stirrers 23, 24 and the opposite and discordant direction of their stirring action, defined by the respective axes of electromagnetic stirring X1, X2, allows to effect in an optimal manner the metal charge 25 introduced and accumulated in correspondence with the charging zone 28. Thanks to the direction of the stirring forces, the new metal charge 25 introduced is gradually incorporated into the previous one, thus promoting the uniformity of the temperature also in correspondence with the zone of the tapping hole 17, which is positioned further away from the center of the electric arc furnace 10.

Furthermore, this configuration and mode of actuation of the electromagnetic stirrers 23, 24 allow to obtain a more uniform distribution of the speed, preventing vortices and/or instability in the flow of the liquid metal L.

In this case, the flow of the liquid metal L, since it is substantially circular and tangential with respect to the lateral wall 16 of the shell 11, has a reduced radial component of momentum. This helps to limit the erosive effect on the lateral wall 16 and therefore reduce the need for frequent maintenance and repair interventions.

In accordance with some embodiments, during the refining step the mixing forces F1, F2 have a concordant sense, that is, the electromagnetic stirrers 23 and 24 are powered so that the axes of the electromagnetic forces generated (indicated in FIG. 3 with the arrow F5 for the electromagnetic stirrer 23 and with the arrow F4 for the electromagnetic stirrer 24) have the same direction and sense.

In this case, both the stirrers 23, 24 promote a movement of the liquid metal L toward a same peripheral zone of the furnace 10, in particular toward the decentered tapping hole 17, and the liquid metal L is then bounced on the perimeter and returns toward the center, moving in the direction of the slagging door 22, FIG. 3.

This allows to also homogenize the temperature in the central zone of the shell 11 which, during the charging step, in which the flow of liquid metal L moves with greater speed in correspondence with the lateral wall 16 of the shell 11, is scarcely mixed.

In accordance with some embodiments, during the at least one charging step and the refining step, the control unit 27 sends a control signal to the power supply device 26 which energizes the first electromagnetic stirrer 23 with a first electric current and the second electromagnetic stirrer 24 with a second electric current so as to generate respectively the first electromagnetic field and the second electromagnetic field as above, suitably directed in a reciprocally discordant, or opposite, sense, or in a concordant sense, that is, with the same direction, depending on the one or the other of said steps.

In accordance with some embodiments, the control unit 27 can receive a charge signal from the feed means 13 proportional to the quantity of metal charge 25 introduced into the electric arc furnace 10, and send an operating signal to the power supply device 26 so as to define the first current and the second current on the basis of the quantity of metal charge 25 introduced.

The greater the quantity of metal charge 25 introduced, the greater the intensity of the electric currents, because respective mixing forces F1, F2 have to stir a larger quantity of liquid metal L.

This allows to automatically adjust the stirring action of the electromagnetic stirrers 23, 24 always obtaining a perfect and homogeneous mixing of the liquid metal L.

In accordance with some embodiments, during the at least one charging step and the refining step, the first electric current and the second electric current can have the same intensity.

In accordance with further embodiments, during the at least one charging step and the refining step, the first electric current and the second electric current can have different intensities.

In particular, during the charging step it is possible to provide that the electric currents have a greater intensity than the electric currents during the refining step.

In fact, the presence of metal charge 25 that is partly melted and/or in solid state requires mixing forces F1, F2 greater than those necessary to stir the liquid metal L at the end of the melting process and during the refining step.

Varying the intensity of the electric currents in relation to the charging and refining steps as above and/or according to the quantity of metal charge 25 introduced, allows to optimize the overall energy consumption of the electric arc furnace 10.

It is clear that modifications and/or additions of steps may be made to the method for electromagnetic stirring of liquid metal in an electric arc furnace as described heretofore, without departing from the field and scope of the present invention.

It is also clear that, although the present invention has been described with reference to some specific examples, a person of skill in the art shall certainly be able to achieve many other equivalent forms of a method for electromagnetic stirring of liquid metal in an electric arc furnace, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A method for electromagnetic stirring of liquid metal in a continuous charge electric arc furnace, comprising:
generating, using a plurality of electromagnetic stirrers, at least one first electromagnetic field along a first axis of electromagnetic stirring and at least one second electromagnetic field along a second axis of electromagnetic stirring,
wherein the furnace has a cycle including a first step and a second step,
wherein in the first step of the cycle of the furnace, said first electromagnetic field and said second electromagnetic field generate mixing forces axes of which are in directions opposite to each other on the liquid metal, and in the second step of the cycle of the furnace, said electromagnetic fields generate forces axes of which are in a concordant direction as each other on the liquid metal, wherein charging is performed in said first step and refining is performed in said second step.

2. The method as in claim 1, wherein both during said first step and during said second step, said first axis of electromagnetic stirring and said second axis of electromagnetic stirring are parallel to each other and to a vertical central plane, which is a vertical plane that passes through the center of the electric arc furnace and through a tapping hole of said electric arc furnace.

3. The method as in claim 1, wherein during said first step said mixing forces determine a flow of the liquid metal in a counterclockwise peripheral direction.

4. The method as in claim 1, wherein during said first step said mixing forces determine a flow of the liquid metal in a clockwise peripheral direction.

5. The method as in claim 1, wherein during said second step, said mixing forces determine a flow of the liquid metal in a first direction, which is a direction of a tapping hole of said electric arc furnace, and subsequently in a second direction, which is the opposite direction to the first direction and toward a central zone of said electric arc furnace.

6. The method as in claim 1, wherein during said first step and said second step, a control unit sends an operative signal to a power supply device that energizes at least one first electromagnetic stirrer of the plurality of electromagnetic stirrers with a first electric current and at least one second electromagnetic stirrer of the plurality of electromagnetic stirrers with a second electric current so as to generate respectively said first electromagnetic field and said second electromagnetic field, directed according to said first step or directed according to said second step.

7. The method as in claim 6, wherein said control unit receives a charge signal from feed means proportional to the quantity of metal charge introduced in said electric arc furnace, and sends said operative signal to said power supply device so that said first electric current and said second electric current have an intensity proportional to said quantity of metal charge introduced.

8. The method as in claim 6, wherein during said first step and said second step, said first electric current and said second electric current have the same intensity.

9. The method as in claim 6, wherein during said first step and said second step, said first electric current and said second electric current have different intensities.

10. The method as in claim 9, wherein in said first step said first and second electric currents have a greater intensity than the first and second electric currents in said second step.

* * * * *